3,003,280
NOISE MAKING TOY
Glenn A. Gordon, 927 Division St., Charleston, Ill.
Filed Dec. 29, 1959, Ser. No. 862,545
2 Claims. (Cl. 46—175)

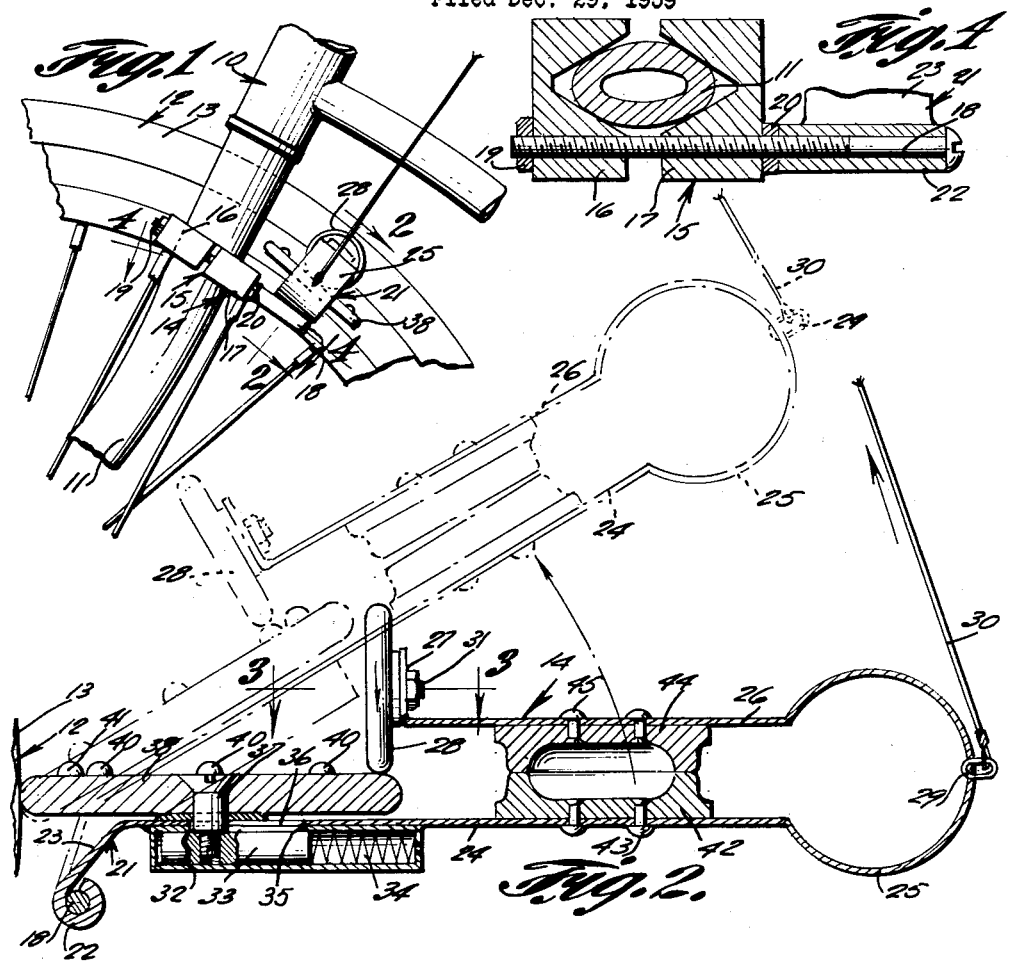
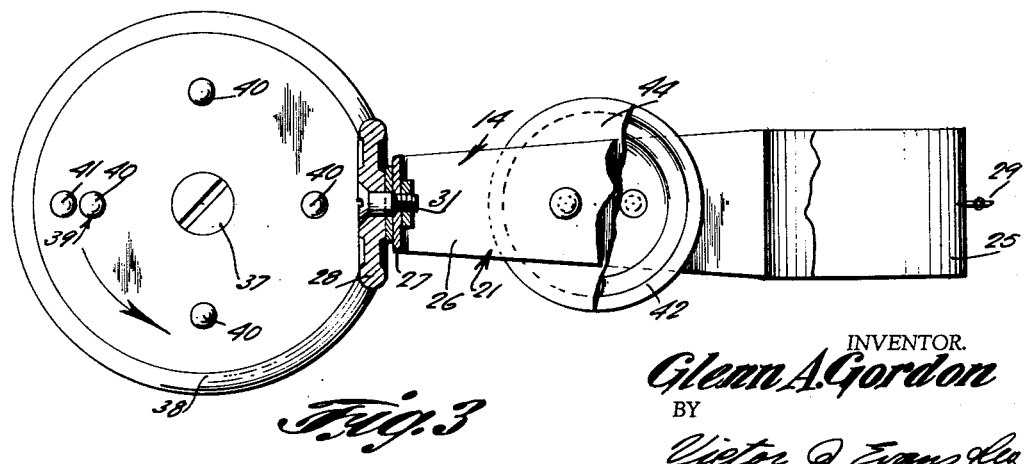

This invention relates to a toy noise maker, and more particularly to a noise maker with use for a bicycle.

The object of the invention is to provide a noise maker which is adapted to be readily mounted on or clamped to a conventional bicycle so that as the bicycle is used or driven, a realistic noise or sound can be produced in order to provide increased recreation and pleasure to the user or onlookers.

Another object of the invention is to provide a toy noise maker for a bicycle which can be readily actuated by means of a cable or line that is adapted to be arranged contiguous to the bicycle handlebars so that a sound will be produced which will simulate or resemble the exhaust sound of an engine or motor such as a small gasoline driven motor and wherein the device can be actuated so that the sound can vary in that it can be actuated to produce an intermittent missing sound or an even purring motor exhaust like sound, as desired.

A further object of the invention is to provide a bicycle noise maker which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a fragmentary elevational view showing the mounting of the present invention on the front fork of a bicycle.

FIGURE 2 is a sectional view taken on the line 2—2 of FIGURE 1 and showing the parts on an enlarged scale.

FIGURE 3 is a sectional view taken on the line 3—3 of FIGURE 2.

FIGURE 4 is a sectional view taken on the line 4—4 of FIGURE 1.

Referring in detail to the drawings, the numeral 10 indicates a portion of a conventional bicycle which includes the usual front fork 11 as well as the usual front wheel 12 which has the tire 13 thereon.

According to the present invention there is provided a toy noise maker which is indicated generally by the numeral 14, and the toy noise maker 14 includes a clamp 15 that is arranged in engagement with the front fork 11. The clamp 15 includes a pair of separate sections 16 and 17 which are maintained in clamping engagement on the front fork 11 by means of a bolt or rod 18 which has lock nuts 19 and 20 thereon, FIGURE 4.

There is further provided a support member 21 which has an end portion 22 pivotally or hingedly mounted on the rod 18, and the support member 21 also includes a section 23 as well as a main body portion 24. The main body portion 24 terminates in an arcuate or curved spring portion 25, and the spring portion 25 terminates in a flat section 26, the flat section 26 being arranged in spaced parallel relation with respect to the main body portion 24. The numeral 27 indicates a lip which is arranged at right angles with respect to an end of the flat section 26, and a rotary wheel 28 is connected to the lip 27 through the medium of a pin or bolt 31.

The numeral 30 indicates an actuating line or cable which has a connection to the spring portion 25 through the medium of a hook or ring 29, the other end of the cable 30 is adapted to be arranged contiguous to the handle bars of the bicycle.

The numeral 32 indicates a hollow casing or tube which is secured as by welding to the lower surface of the main body portion 24, and a plunger or piston 33 is slidably positioned in the casing 32, there being a coil spring 34 within the casing 32, and the coil spring 34 abuts or engages the adjacent end of the plunger 33.

The casing 32 is provided with a slot or cutout 35 which registers with a similar elongated slot 36 in the main body portion 24, and the numeral 37 indicates a pin which extends through a rotary wheel 38 and the pin 37 has a portion extending through the registering slots 36 and 35, and the inner end of the pin 37 is threadedly connected to the plunger 33. As shown in FIGURE 3 for example there is provided on the upper surface of the disk 38 a plurality of generally rounded lugs or projections 39. These lugs 39 are arranged in a predetermined pattern for a purpose to be later described. For example as shown in FIGURE 3 four of the lugs 40 are arranged in a common circular orbit with the same radius. Furthermore, there is an additional lug 41 which is arranged outside of the circular orbit of the lugs 40, and these lugs are adapted to be selectively engaged by the wheel 28 as the cable 30 is actuated, as later described in this application.

There is further provided a pair of similar cup shaped sounding members 42 and 44 which are mounted for movement toward and away from each other. The cup shaped member 42 is adapted to be fastened to the main body portion 24 in any suitable manner, as for example by means of securing elements 43, and the cup shaped member 44 is adapted to be fastened to the flat section 26 by means of the securing element 45.

From the foregoing, it is apparent that there has been provided a toy noise maker which is especially suitable for use on bicycles, and in use with the parts arranged as shown in the drawings, it will be seen that the clamp 15 is adapted to be fastened to the front fork 11 of the bicycle 10, and the bolt or rod 18 with its lock nut will maintain the clamp 15 in the desired position on the front fork 11. The support member 21 has its end portion 22 pivotally connected to the rod 18, and when it is desired to produce the sound, the cable 30 is pulled on by the person operating the bicycle and this causes the disk 38 to move into engagement with the tire 13 of the front wheel 12 so as to rotate the disk 38, and at the same time, the wheel 28 will move into engagement with the lugs 39.

It will be seen that the flat section 26 will alternately move towards and away from the main body portion 24 and this will cause the cup shaped elements 44 and 42 to move into and out of sounding engagement with respect to each other so as to produce the desired sound. The spring portion 25 serves to return the elements 42 and 44 together after they have been moved apart each time by a corresponding lug 40 which engages the wheel 28.

The parts can be made of any suitable material and in different shapes or sizes.

Different types of clamps or brackets can be used for fastening the device to the bicycle fork or frame. The clamp is adjustable so that it can be arranged at a desired location. It is to be understood that braces, bearings, or the like can be used whenever desired or required.

The cup shaped elements 42 and 44 are hollowed out so as to provide the desired sounding effect as they move into and out of engagement with each other. The present invention thus provides a toy noise maker for attachment to a bicycle and wherein the device is mounted on the fork or frame of the bicycle. The string or cable 30 is adapted to be pulled by the bicycle rider so as to cause the disk 38 to move into contact with the side wall of the tire 13. As the cord 30 is pulled, the disk 38 contacts the bicycle tire side wall as indicated by the numeral 13, and this starts the disk or wheel 38 to spin or rotate. As the cord 30 is pulled a little harder, it causes the plunger or slide 33 on which the disk 38 is mounted, to go against the spring 34, and at the same time carry the disk 38 to an angular position as shown in broken lines in FIGURE 2 for example. On the disk 38 there is illustrated five bumps or lugs 39 which are arranged to interrupt the travel of the wheel 28 as the disk 38 slides in when the cord 30 is pulled. As the wheel 28 rolls over the obstructions 39 it causes the cups 44 and 42 to move apart, and as the wheel 28 rolls down from the top of the lugs or bumps or obstructions 39, the cups 44 and 42 snap together with a sound simulating cupped hands clapping or the sound of a small motor exhausting.

This snapping together of the cups 44 and 42 is caused by the spring steel 25 which is formed integral with or secured to the section 26, and there is also provided a lip 27 which holds the wheel 28, as well as the portion 24 which holds the assembly on the disk 38 and the cups 44 and 42 are fastened in place as previously described.

The arrangement of the bumps or obstructions or lugs 39 on the disk 38 is such that there is provided four of the lugs 40 in one circle or series, but it is to be understood that the number of spacing of these lugs can be varied as desired, to give different sound effects. In FIGURE 3 there is illustrated one lug 41 in the outer portion of the disk, while there is four of the lugs in an inner circular arrangement. As the cord 30 is pulled, the exhaust like sound varies, first resembling a small motor with the gasoline cut down to lean, and then as the cord 30 is pulled harder the four lugs 40 on the disk 38 come into the path of the wheel 28 and the sound resembles that of a motor hitting evenly. Thus, it goes from one intermittent missing to an even purring motor exhaust like sound.

Minor changes in shape, size and rearrangement of details coming within the field of invention claimed, may be resorted to in actual practice if desired.

What is claimed is:

1. A toy noise maker comprising a clamp, a rod affixed to said clamp, a support member having an end portion hingedly mounted on said rod, said support member embodying a main body portion which terminates in a curved spring portion, said spring portion terminating in a flat section which is arranged in spaced parallel relation with respect to said main body portion, a lip arranged at right angles with respect to said flat section, coacting hollow cup-shaped members affixed to said main body portion and to said flat section, an actuating cable affixed to said spring portion, a wheel rotatably connected to said lip, a hollow casing secured to the lower surface of said main body portion, a plunger slidably arranged in said casing, a coil spring arranged within said casing and said coil spring abutting and engaging the adjacent end of the plunger, there being registering slots in said main body portion and casing, a pin extending through said slots and connected to said plunger, a disc mounted on said pin, and a plurality of spaced apart projections on a surface of said disc adapted to be selectively engaged by said wheel.

2. A toy noise maker comprising a clamp, a rod affixed to said clamp, a support member having an end portion hingedly mounted on said rod, said support member embodying a main body portion which terminates in a curved spring portion, said spring portion terminating in a flat section which is arranged in spaced parallel relation with respect to said main body portion, a lip arranged at right angles with respect to said flat section, coacting hollow cup-shaped members affixed to said main body portion and to said flat section, an actuating cable affixed to said spring portion, a wheel rotatably connected to said lip, a hollow casing secured to the lower surface of said main body portion, a plunger slidably arranged in said casing, a coil spring arranged within said casing and said coil spring abutting and engaging the adjacent end of the plunger, there being registering slots in said main body portion and casing, a pin extending through said slots and connected to said plunger, a disc mounted on said pin, and a plurality of spaced apart projections on a surface of said disc adapted to be selectively engaged by said wheel, a majority of said projections being arranged in a circular series, and at least one of the projections being arranged outside of the circular series.

References Cited in the file of this patent
UNITED STATES PATENTS 2,603,035     Countryman et al. _____ July 15, 1952
2,721,421     Steele _____ Oct. 25, 1955